United States Patent
Lee et al.

(10) Patent No.: US 10,419,173 B2
(45) Date of Patent: Sep. 17, 2019

(54) METHOD AND APPARATUS FOR TRANSMITTING UPLINK SIGNAL USING A SHORT TRANSMIT TIME INTERVAL

(71) Applicant: ELECTRONICS AND TELECOMMUNICATIONS RESEARCH INSTITUTE, Daejeon (KR)

(72) Inventors: Yu Ro Lee, Daejeon (KR); Kwang Jae Lim, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 342 days.

(21) Appl. No.: 15/360,442

(22) Filed: Nov. 23, 2016

(65) Prior Publication Data
US 2017/0149542 A1    May 25, 2017

(30) Foreign Application Priority Data

Nov. 23, 2015 (KR) .................. 10-2015-0164170
Nov. 23, 2016 (KR) .................. 10-2016-0156705

(51) Int. Cl.
*H04L 5/00* (2006.01)
*H04W 72/04* (2009.01)
(Continued)

(52) U.S. Cl.
CPC .......... *H04L 5/0044* (2013.01); *H04L 5/0048* (2013.01); *H04L 5/0051* (2013.01);
(Continued)

(58) Field of Classification Search
CPC ... H04L 5/0044; H04L 5/0051; H04L 5/0012; H04L 5/0048; H04L 27/2613;
(Continued)

(56) References Cited

U.S. PATENT DOCUMENTS 7,796,695 B2    9/2010 Lee et al.
8,279,825 B2    10/2012 Koo et al.
(Continued)

FOREIGN PATENT DOCUMENTS

KR    10-2014-0132336 A    11/2014
KR    10-1617269 B1    5/2016

OTHER PUBLICATIONS

Ericsson, Study of shorter TTI for latency reduction, Nov. 5, 2015, 8 pages.*

*Primary Examiner* — Mounir Moutaouakil
(74) *Attorney, Agent, or Firm* — Rabin & Berdo, P.C.

(57) ABSTRACT

Disclosed herein are a method and an apparatus for transmitting an uplink signal. The method for transmitting an uplink signal includes: transmitting an uplink data in at least one symbol included in a short transmit time interval (sTTI) including 7 symbols or less; and transmitting a demodulation reference signal (DMRS) for the uplink data through an even-numbered subcarrier or an odd-numbered subcarrier in one symbol in which the uplink data is not transmitted, among the symbols included in the sTTI.

11 Claims, 11 Drawing Sheets

(51) Int. Cl.
*H04W 72/12* (2009.01)
*H04B 1/713* (2011.01)

(52) U.S. Cl.
CPC ... *H04W 72/0413* (2013.01); *H04W 72/1268* (2013.01); *H04B 1/713* (2013.01); *H04L 5/0012* (2013.01)

(58) Field of Classification Search
CPC .............. H04B 1/713; H04W 72/1268; H04W 72/0413; H04W 72/0446; H04W 72/14
See application file for complete search history.

(56) References Cited

U.S. PATENT DOCUMENTS

| | | | |
|---|---|---|---|
| 2006/0203707 A1* | 9/2006 | Lee | H04B 1/7143 370/208 |
| 2007/0248113 A1* | 10/2007 | Ko | H04B 7/0613 370/436 |
| 2010/0157918 A1 | 6/2010 | Kim et al. | |
| 2013/0034011 A1* | 2/2013 | Yoon | H04L 5/0048 370/252 |
| 2013/0114501 A1* | 5/2013 | Kishiyama | H04J 13/004 370/328 |
| 2013/0148593 A1* | 6/2013 | Suzuki | H04L 5/0051 370/329 |
| 2015/0003356 A1 | 1/2015 | Seo et al. | |
| 2015/0036604 A1* | 2/2015 | Park | H04L 5/0037 370/329 |
| 2015/0173070 A1 | 6/2015 | Aboul-Magd et al. | |
| 2018/0115984 A1* | 4/2018 | Sahlin | H04W 72/1268 |

\* cited by examiner

METHOD AND APPARATUS FOR TRANSMITTING UPLINK SIGNAL USING A SHORT TRANSMIT TIME INTERVAL

CROSS-REFERENCE TO RELATED APPLICATION

This application claims priority to and the benefit of Korean Patent Application Nos. 10-2015-0164170 and 10-2016-0156705 filed in the Korean Intellectual Property Office on Nov. 23, 2015 and Nov. 23, 2016, the entire contents of which are incorporated herein by reference.

BACKGROUND OF THE INVENTION (a) Field of the Invention

The present invention relates to a method and an apparatus for transmitting an uplink signal.

(b) Description of the Related Art

A frame of a long term evolution (LTE) system (frequency division duplex (FDD) type) includes 10 subframes, in which each subframe includes two slots. Each slot includes 6 or 7 orthogonal frequency division multiplexing (OFDM) symbols depending on a length of a cyclic prefix (CP). At this time, a transmit time interval (TTI) is a data transmit unit and is 1 [ms] equal to a length of the subframe.

Each slot of the subframe of the LTE system consists of a resource block (RB) unit that includes 12 subcarriers and 7 symbols. The RB located at a boundary on a frequency axis of a used band is allocated a physical uplink control channel (PUCCH) data and a PUCCH demodulation reference signal (PUCCH DMRS) and an inside of the PUCCH is allocated a physical uplink shared channel (PUSCH) data and a PUSCH DMRS. A final symbol of each subframe may be allocated a sounding reference signal (SRS).

When channel characteristics for each RB allocated to a terminal are not accurately known or a moving speed of the terminal is fast, frequency hopping may be performed to obtain a frequency diversity gain. The frequency hopping of each terminal may be performed in a unit of two slots depending on a predetermined hopping pattern. The base station may use the DMRS of each slot to perform channel estimation. Further, a low PAPR may be maintained by single carrier-frequency division multiple access (SC-FDMA) characteristics.

Meanwhile, a hybrid-automatic repeat request (HARQ) round trip time (RTT) of the LTE system consists of time required for downlink transmission/reception and time required for uplink transmission/reception. The time required for downlink transmission/reception includes downlink preparing time (time required for a base station to prepare downlink transmission), downlink TTI (i.e., time required for downlink transmission), propagation delay (difference between transmitting time and reception time in a radio section), and downlink processing time (i.e., time required for the terminal to process downlink reception). The time required for uplink transmission/reception includes uplink preparing time, uplink TTI, propagation delay, and uplink processing time. Therefore, to reduce the HARQ RTT, the TTIs of the downlink and the uplink need to be reduced and the processing time of the base station and the processing time of the terminal need to be shortened.

SUMMARY OF THE INVENTION

The present invention has been made in an effort to provide a method and an apparatus for transmitting an uplink signal through sTTI including a smaller number of symbols.

An example embodiment of the present invention provides a method for transmitting an uplink signal. The method for transmitting an uplink signal includes: transmitting an uplink data in at least one symbol included in a short transmit time interval (sTTI) including 7 symbols or less; and transmitting a demodulation reference signal (DMRS) for the uplink data through an even-numbered subcarrier or an odd-numbered subcarrier in one symbol in which the uplink data is not transmitted, among the symbols included in the sTTI.

If the sTTI includes three or four symbols, the DMRS may be located at a first symbol among the symbols and the uplink data may be located at the rest symbols and the transmitting of the uplink data may include performing frequency hopping in a unit of n clusters including different subcarriers, in each symbol.

If the sTTI includes seven symbols, the DMRS may be located at a middle symbol among the symbols and the uplink data may be located at the rest symbols and the transmitting of the uplink data may include performing frequency hopping in a unit of n clusters including different subcarriers, in both symbol groups with respect to the middle symbol.

The transmitting of the DMRS may include multiplying the DMRS by a cyclic shift coefficient consisting of a component for differentiating a terminal and a subcarrier number through which the DMRS is transmitted.

The transmitting of the DMRS may include multiplying the DMRS by an orthogonal cover code (OCC).

The method may further include: transmitting a first DMRS for a first uplink data transmitted at a first sTTI, in the symbol included in the first sTTI spaced apart from the sTTI by at least one sTTI.

The transmitting of the first DMRS in the symbol included in the first sTTI may include transmitting the first DMRS through the same subcarrier as the subcarrier for transmitting the DMRS of the sTTI.

The transmitting of the first DMRS in the symbol included in the first sTTI may include transmitting the first DMRS through a subcarrier different from the subcarrier for transmitting the DMRS of the sTTI.

The sTTI and the first sTTI may include two or three symbols.

The method may further include: transmitting an uplink data in all symbols included in the sTTI and the first sTTI.

Another embodiment of the present invention provides a terminal including: a processor, a memory, and a radio frequency unit, in which the processor executes a program stored in the memory to perform: transmitting an uplink data in at least one symbol included in a short transmit time interval (sTTI) including 7 symbols or less; and transmitting a demodulation reference signal (DMRS) for the uplink data through an even-numbered subcarrier or an odd-numbered subcarrier in one symbol in which the uplink data is not transmitted, among the symbols included in the sTTI.

If the sTTI includes three or four symbols, the DMRS may be located at a first symbol among the symbols and the uplink data may be located at the rest symbols and the processor may perform performing frequency hopping in a unit of n clusters including different subcarriers, in each symbol, when the transmitting of the uplink data is performed.

If the sTTI includes seven symbols, the DMRS may be located at a middle symbol among the symbols and the uplink data may be located at the rest symbols and the processor may perform performing frequency hopping in a unit of n clusters including different subcarriers, in both symbol groups with respect to the middle symbol, when the transmitting of the uplink data is performed.

The processor may perform multiplying the DMRS by a cyclic shift coefficient consisting of a component for differentiating a terminal and a subcarrier number through which the DMRS is transmitted, when the transmitting of the DMRS is performed.

The processor may perform multiplying the DMRS by an orthogonal cover code (OCC), when the transmitting of the DMRS is performed.

The processor may execute a program stored in the memory to further perform transmitting a first DMRS for a first uplink data transmitted at a first sTTI, in the symbol included in the first sTTI spaced apart from the sTTI by at least one sTTI.

The processor may perform transmitting the first DMRS through the same subcarrier as the subcarrier for transmitting the DMRS of the sTTI, when the transmitting of the first DMRS in the symbol included in the first sTTI is performed.

The processor may perform transmitting the first DMRS through a subcarrier different from the subcarrier for transmitting the DMRS of the sTTI, when the transmitting of the first DMRS in the symbol included in the first sTTI is performed.

The sTTI and the first sTTI may include two or three symbols.

The processor may execute a program stored in the memory to further perform transmitting an uplink data in all symbols included in the sTTI and the first sTTI.

According to an embodiment of the present invention, it is possible to obtain the frequency diversity gain without increasing the PAPR of the data channel, by transmitting the uplink signal through the sTTI including the smaller number of symbols.

DETAILED DESCRIPTION OF THE EMBODIMENTS

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine type communication device (MTC device), and the like and may also include all or some of the functions of the MS, the MT, the AMS, the HR-MS, the SS, the PSS, the AT, the UE, the MTC device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Figure 1:
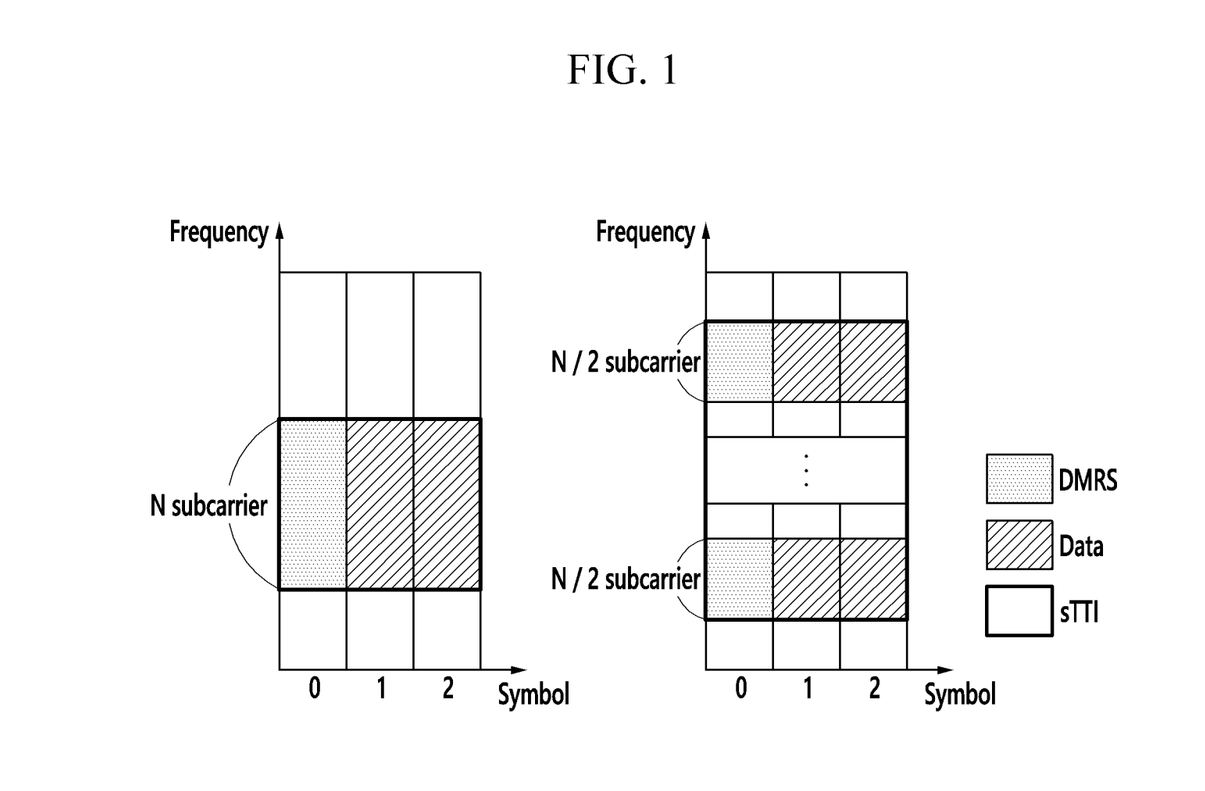
FIG. 1 is a diagram schematically illustrating a frequency hopping method of sTTI according to an exemplary embodiment of the present invention.

FIG. 1 is a diagram schematically illustrating a frequency hopping method of sTTI according to an exemplary embodiment of the present invention.

Referring to FIG. 1, unlike the existing LTE system, TTI includes 3 symbols and therefore one TTI has one DMRS. At this time, the TTI having a length smaller than the TTI of the LTE system is called a short transmission time interval (Stti) and the sTTI consists of a short resource block (sRB) unit that is a minimum resource allocation unit. When the frequency hopping is not applied ((a)), N subcarriers are allocated and when frequency hopping is applied, N/2 subcarriers are allocated to each sTTI. Therefore, characteristics of SC-FDMA are hard to be maintained and PAPR is increased.

Figure 2:
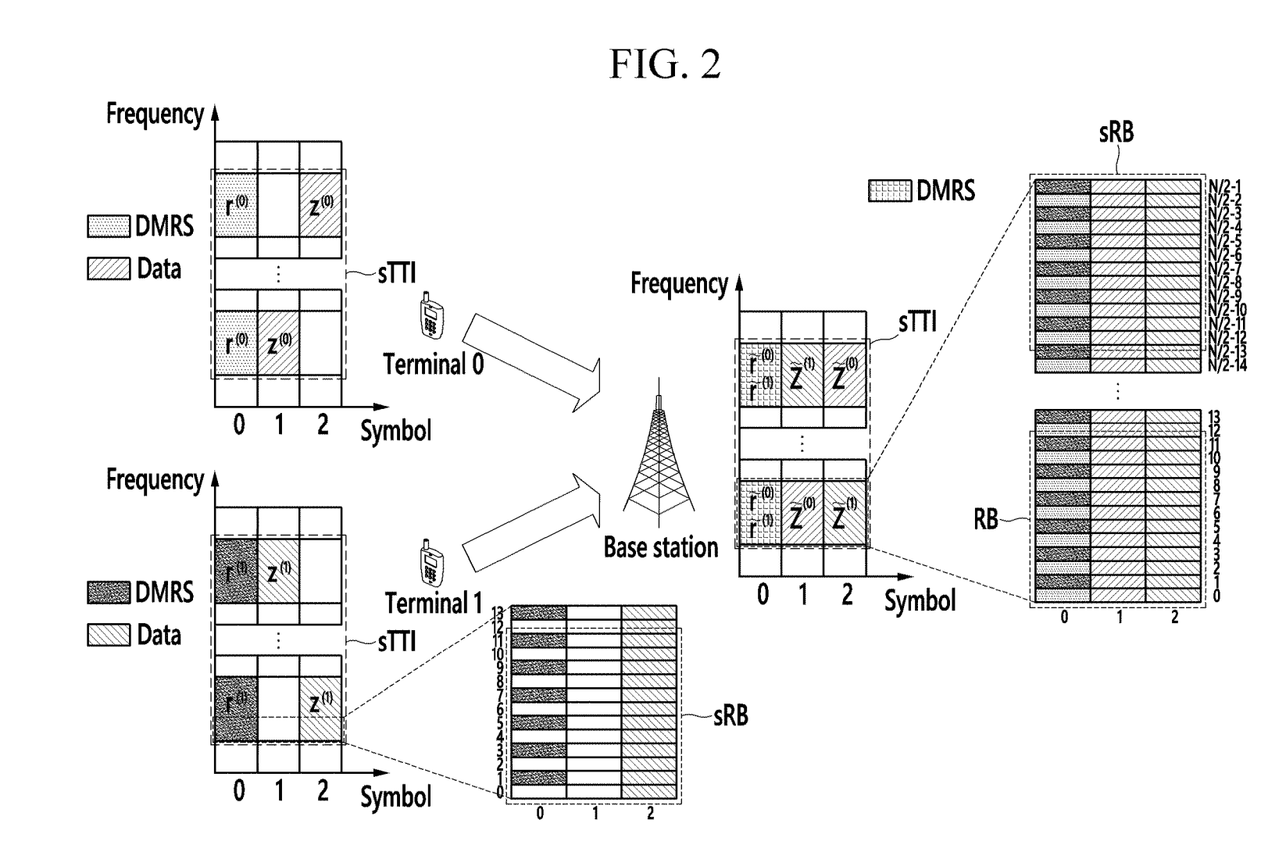
FIG. 2 is a diagram schematically illustrating a method for transmitting, by a terminal, an uplink signal according to an exemplary embodiment of the present invention.

FIG. 2 is a diagram schematically illustrating a method for transmitting, by a terminal, an uplink signal according to an exemplary embodiment of the present invention.

Referring to FIG. 2, when a time length of the DMRS for PUSCH is 1 symbol and a time length of the PUSCH is 2 symbols, a method for transmitting, by a terminal, an uplink signal is illustrated. In FIG. 2, the DMRS is located at symbol No. 0, and therefore may be transmitted, followed by the PUSCH. In FIG. 2, a size of sRB on a frequency axis is 12 subcarriers and a size of the sRB on the time base is 3 symbols.

When the number of subcarriers allocated to an uplink resource is N, the frequency hopping is performed on two clusters each including N/2 subcarriers and each cluster includes a plurality of sRBs. Referring to FIG. 2, terminal 0 transmits the DMRS using even subcarriers and terminal 1 transmits the DMRS using odd subcarriers.

Further, in #1 symbol, the terminal 0 transmits an uplink data through a lower cluster (cluster including a subcarrier having a low index) and the terminal 1 transmits an uplink data through an upper cluster (cluster including a subcarrier having a high index). In FIG. 2, each terminal performs the frequency hopping in a unit of cluster, and therefore in #2 symbol, the terminal 0 transmits the uplink data through the upper cluster and the terminal 1 transmits the uplink data through the lower cluster.

In FIG. 2, $r^{(k)}$ is DMRS that a k-th terminal transmits and is as following Equation 1.

(Equation 1)

$$\text{If } k \bmod 2 = 0,$$
$$\text{if } n \bmod 2 = 0, \text{ then } r^{(k)} = \hat{r}^{(k)}(n) = e^{j\alpha_k n} \bar{r}(\lfloor n/2 \rfloor)$$
$$\text{else} \quad r^{(k)} = \hat{r}^{(k)}(n) = 0$$
$$\text{If } k \bmod 2 = 1,$$
$$\text{if } n \bmod 2 = 1, \text{ then } r^{(k)} = \hat{r}^{(k)}(n) = e^{j\alpha_k n} \bar{r}(\lfloor n/2 \rfloor)$$
$$\text{else} \quad r^{(k)} = \hat{r}^{(k)}(n) = 0$$

In the above Equation 1, $\alpha_k$ is a component for differentiating the k-th terminal and n is a subcarrier number, and therefore $e^{j\alpha_k n}$ is a cyclic shift coefficient. That is, according to the above Equation 1, the terminal using the same subcarrier may be differentiated based on a cyclic shift or a spreading code.

When resources having different sizes are allocated, $z^{(k)}$ is a data that the k-th terminal transmits and is as the following Equation 2.

(Equation 2)

$$\text{If } k \bmod 2 = 0,$$
$$\text{if } n < N/2, \text{ then } z^{(k)} = \hat{z}^{(k)}(n, 0) = \bar{z}^{(k)}(n)$$
$$\text{else} \quad z^{(k)} = \hat{z}^{(k)}(n, 1) = \bar{z}^{(k)}(n)$$
$$\text{If } k \bmod 2 = 1,$$
$$\text{if } n < N/2, \text{ then } z^{(k)} = \hat{z}^{(k)}(n, 1) = \bar{z}^{(k)}(n)$$
$$\text{else} \quad z^{(k)} = \hat{z}^{(k)}(n, 0) = \bar{z}^{(k)}(n)$$

In the above Equation 2, N is the number of data symbols that the terminal transmits. In (n, l), n is a subcarrier number and l is a symbol number of the data symbol other than the DMRS.

Figure 3:
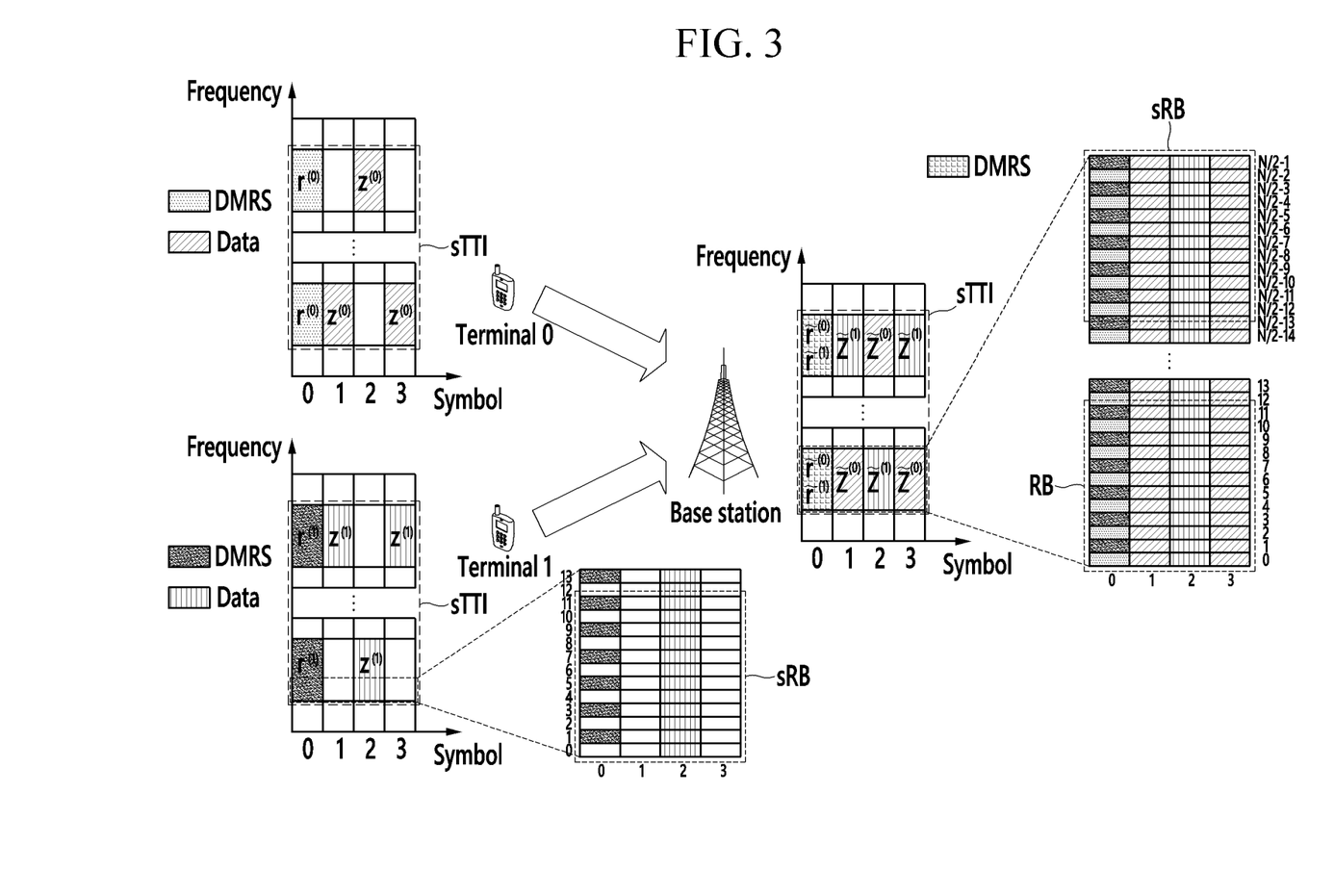
FIG. 3 is a diagram schematically illustrating a method for transmitting, by a terminal, an uplink signal according to another exemplary embodiment of the present invention.

FIG. 3 is a diagram schematically illustrating a method for transmitting, by a terminal, an uplink signal according to another exemplary embodiment of the present invention.

Referring to FIG. 3, when a time length of the DMRS for PUSCH is 1 symbol and a time length of the PUSCH is 3 symbols, a method for transmitting, by a terminal, an uplink signal is illustrated. In FIG. 3, a size of one sRB on the frequency axis is 12 subcarriers and a size of the sRB on the time base is 4 symbols. When the number of subcarriers allocated to the uplink resource is N, the frequency hopping is performed on two clusters each including N/2 subcarriers and each cluster includes a plurality of sRBs. Therefore, the terminal 0 and the terminal 1 select one of two clusters in each symbol to transmit a data.

Figure 4:
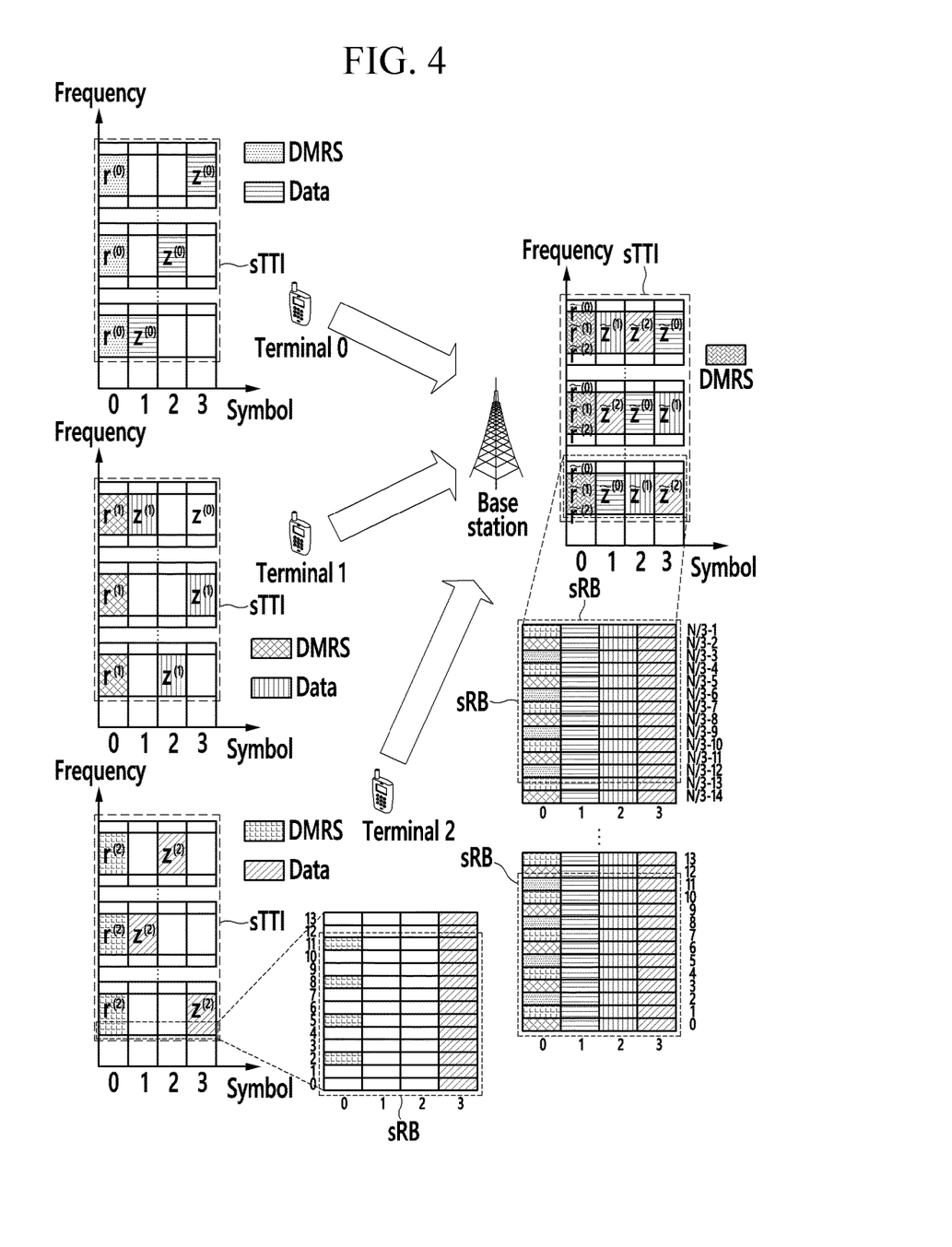
FIG. 4 is a diagram schematically illustrating a method for transmitting, by a terminal, an uplink signal according to yet another exemplary embodiment of the present invention.

FIG. 4 is a diagram schematically illustrating a method for transmitting, by a terminal, an uplink signal according to yet another exemplary embodiment of the present invention.

Referring to FIG. 4, when the time length of the DMRS for the PUSCH is 1 symbol and the time length of the PUSCH is 3 symbols, the method for transmitting, by a terminal, an uplink signal is illustrated. In FIG. 4, the size of one sRB on the frequency axis is 12 subcarriers and the size of the sRB on the time base is 4 symbols. When the number of subcarriers allocated to the uplink resource is N, the frequency hopping is performed on three clusters each including N/3 subcarriers and each cluster includes the plurality of sRBs. Therefore, the terminal 0, the terminal 1, and the terminal 2 select one of three clusters in each symbol to transmit a data.

Figure 5:
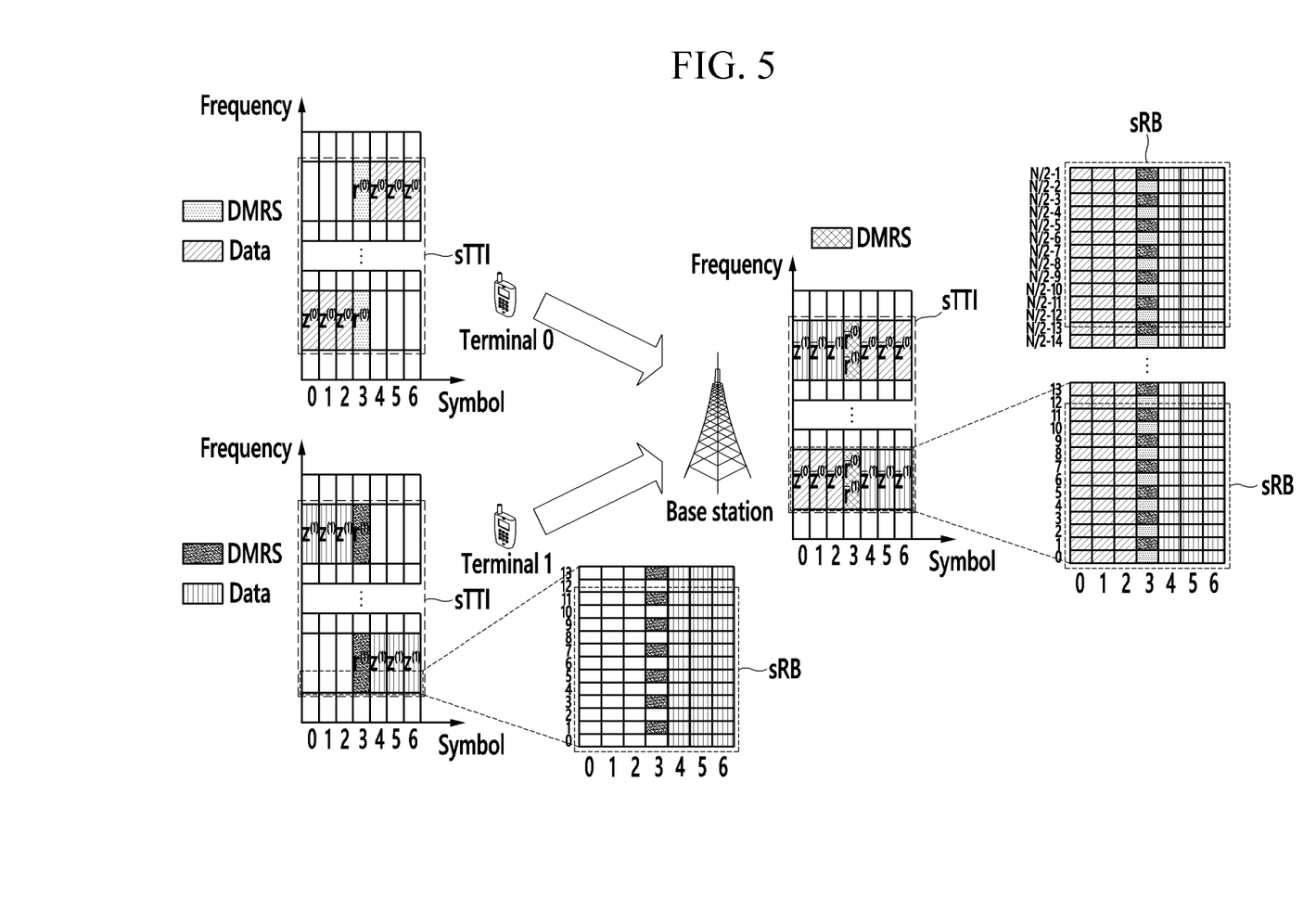
FIG. 5 is a diagram schematically illustrating a method for transmitting, by a terminal, an uplink signal according to still yet another exemplary embodiment of the present invention.

FIG. 5 is a diagram schematically illustrating a method for transmitting, by a terminal, an uplink signal according to still yet another exemplary embodiment of the present invention.

Referring to FIG. 5, when the time length of the DMRS for the PUSCH is 1 symbol and the time length of the PUSCH is 6 symbols, the method for transmitting, by a terminal, an uplink signal is illustrated. In FIG. 5, the DMRS is located at symbol No. 3 (i.e., fourth symbol). That is, as illustrated in FIGS. 2 to 4, the DMRS may be located at a first symbol (symbol No. 0) included in the sTTI, and as illustrated in FIG. 5, the DMRS may be located at a symbol located at a center of symbols included in the sTTI, or the DMRS may also be located at any symbol of the symbols included in the sTTI. In FIG. 5, a size of one resource block on the frequency axis is 12 subcarriers and a size of one resource block on the time base is 7 symbols, and therefore they are the same as the RB of the LTE standard.

When the number of subcarriers allocated to the uplink resource is N, the frequency hopping is performed on two clusters each including N/2 subcarriers and each cluster includes a plurality of RBs. Referring to FIG. 5, in front symbol groups (#0 to #2) with respect to a middle symbol (#3 symbol), the terminal 0 transmits the uplink data through the lower cluster and the terminal 1 transmits the uplink data through the upper cluster. Further, in back symbol groups (#4 to #6) with respect to the middle symbol (#3 symbol), the terminal 0 transmits the uplink data through the upper cluster and the terminal 1 transmits the uplink data through the lower cluster.

Figure 6:
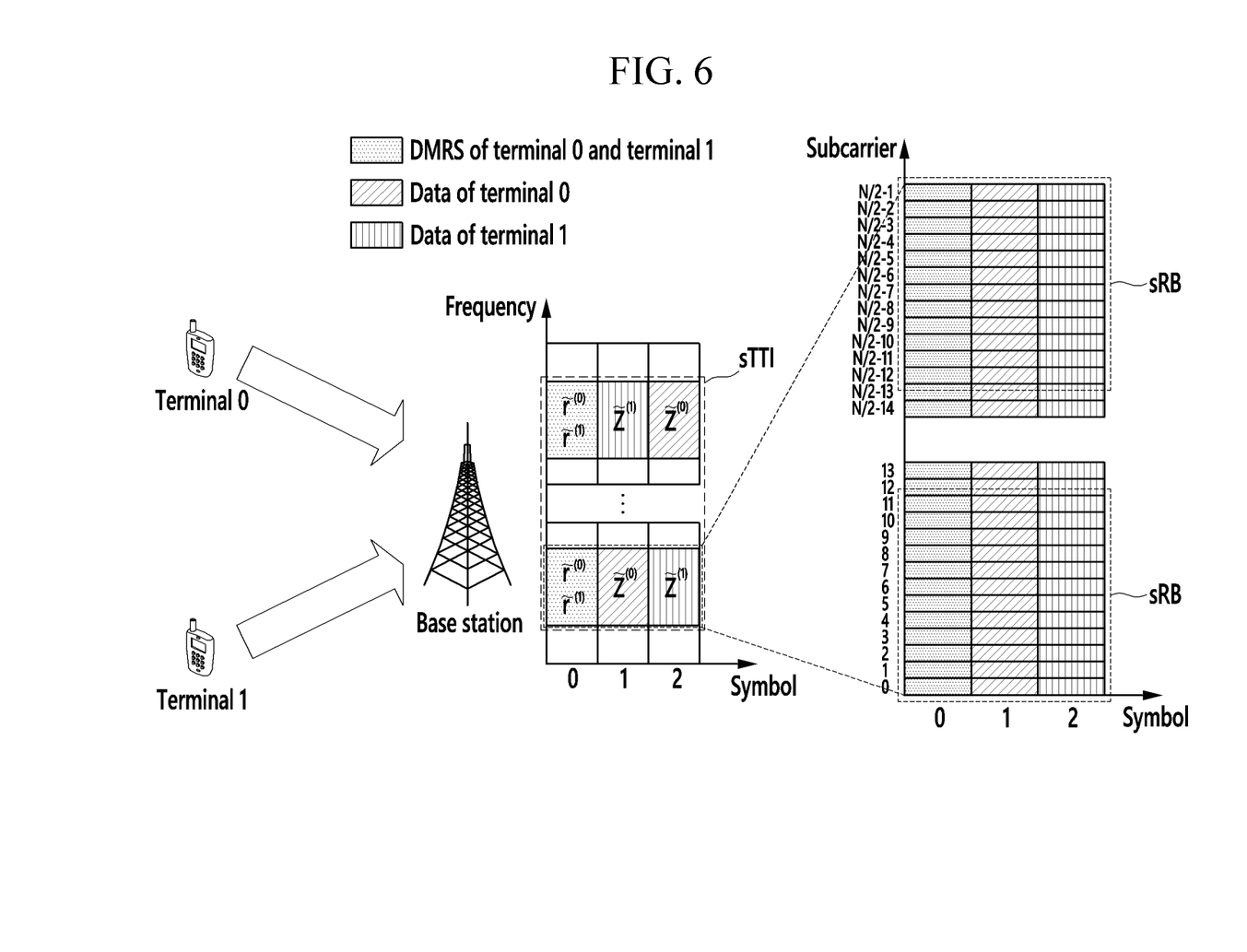
FIG. 6 is a diagram schematically illustrating a method for differentiating DMRS according to an exemplary embodiment of the present invention.

FIG. 6 is a diagram schematically illustrating a method for differentiating DMRS according to an exemplary embodiment of the present invention.

Referring to FIG. 6, the DMRSs received by the base station and transmitted from the plurality of terminal through the same frequency resource are illustrated.

According to an exemplary embodiment of the present invention, the DMRSs transmitted from each terminal may be differentiated by a cyclic shift or an orthogonal cover code (OCC). The following Equation 3 represents the DMRS multiplied by the cyclic shift coefficient.

$$\tilde{r}^{(k)} = \tilde{r}^{(k)}(n) = e^{j\alpha_k n} \bar{r}(n) \qquad \text{(Equation 3)}$$

The following Equation 4 represents the DMRS multiplied by the orthogonal cover code.

$$\tilde{r}^{(k)} = \tilde{r}^{(k)}(n) = c_k(n) \bar{r}(n) \qquad \text{(Equation 4)}$$

In the above Equation 4, as the orthogonal cover code, a spreading code like a Walsh-Hadamard code is used and $c_k(n)$ represents the spreading code. At this time, information on the spreading cover code may be transmitted to the terminal through L1/L2 control signaling or upper layer control signaling.

Figure 7:
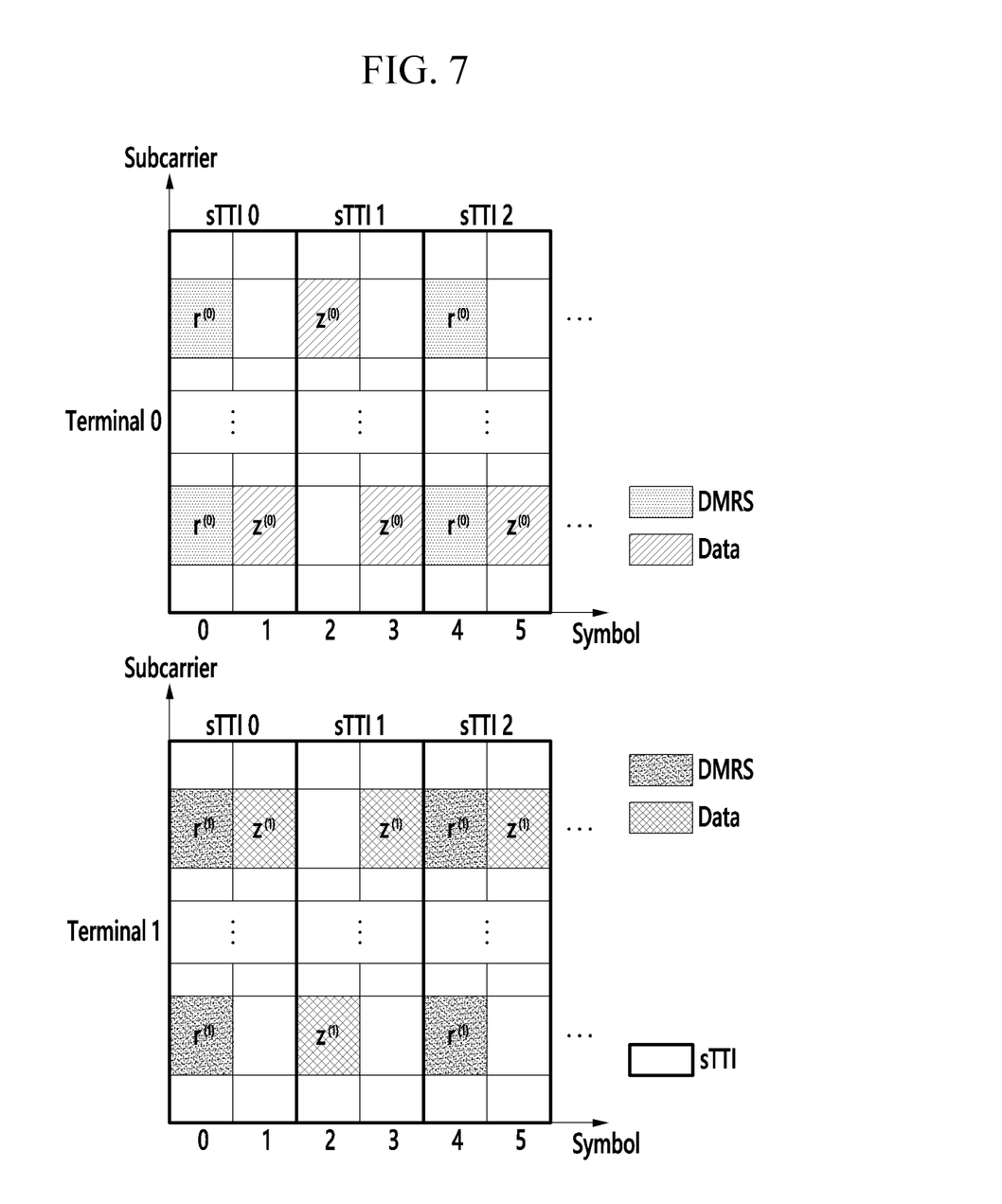
FIG. 7 is a diagram illustrating a method for transmitting, by a terminal, an uplink signal through sTTI having a length of 2 symbols according to an exemplary embodiment of the present invention.
Figure 8:
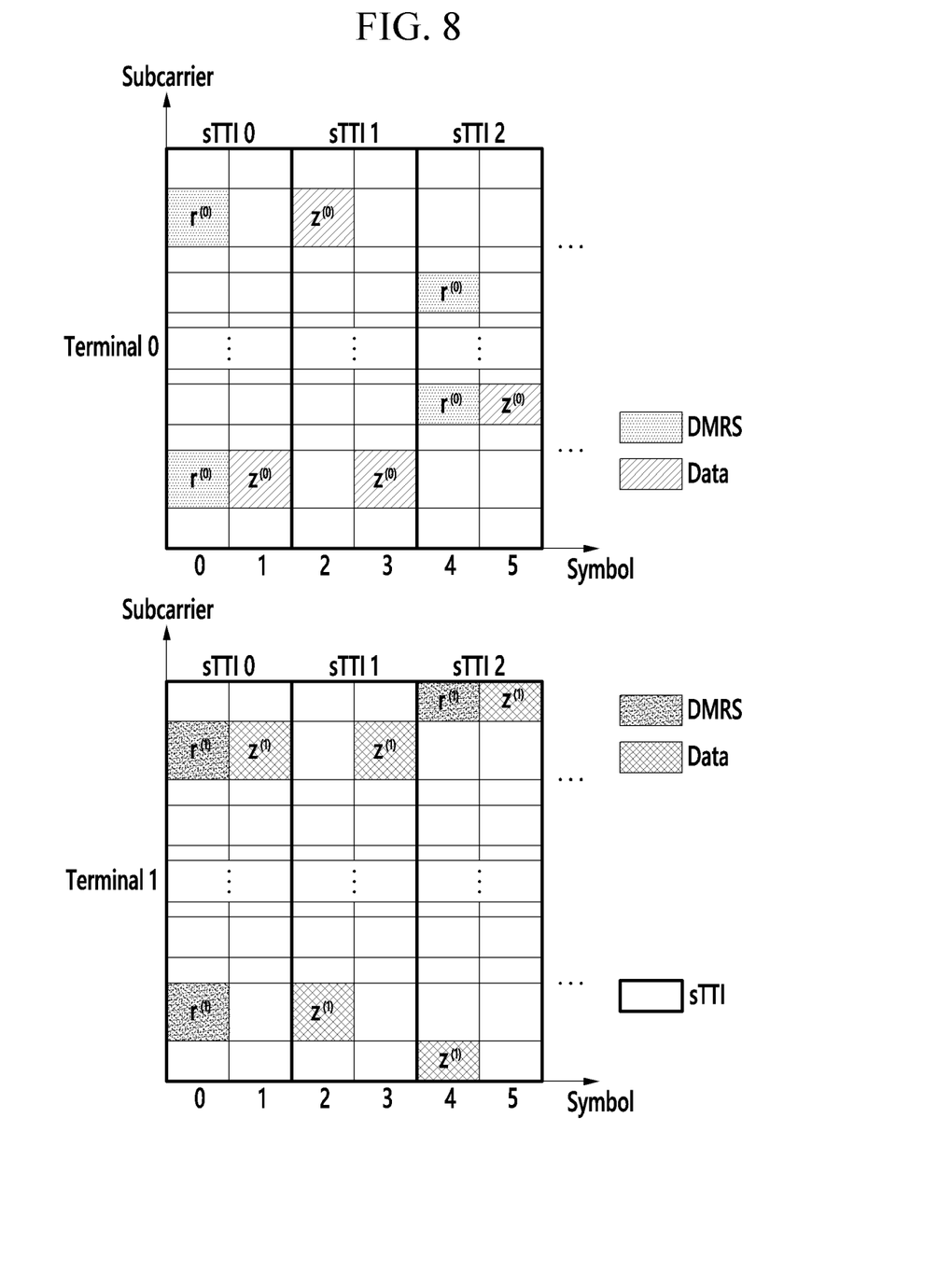
FIG. 8 is a diagram illustrating a method for transmitting, by a terminal, an uplink signal through sTTI having a length of 2 symbols according to another exemplary embodiment of the present invention.
Figure 9:
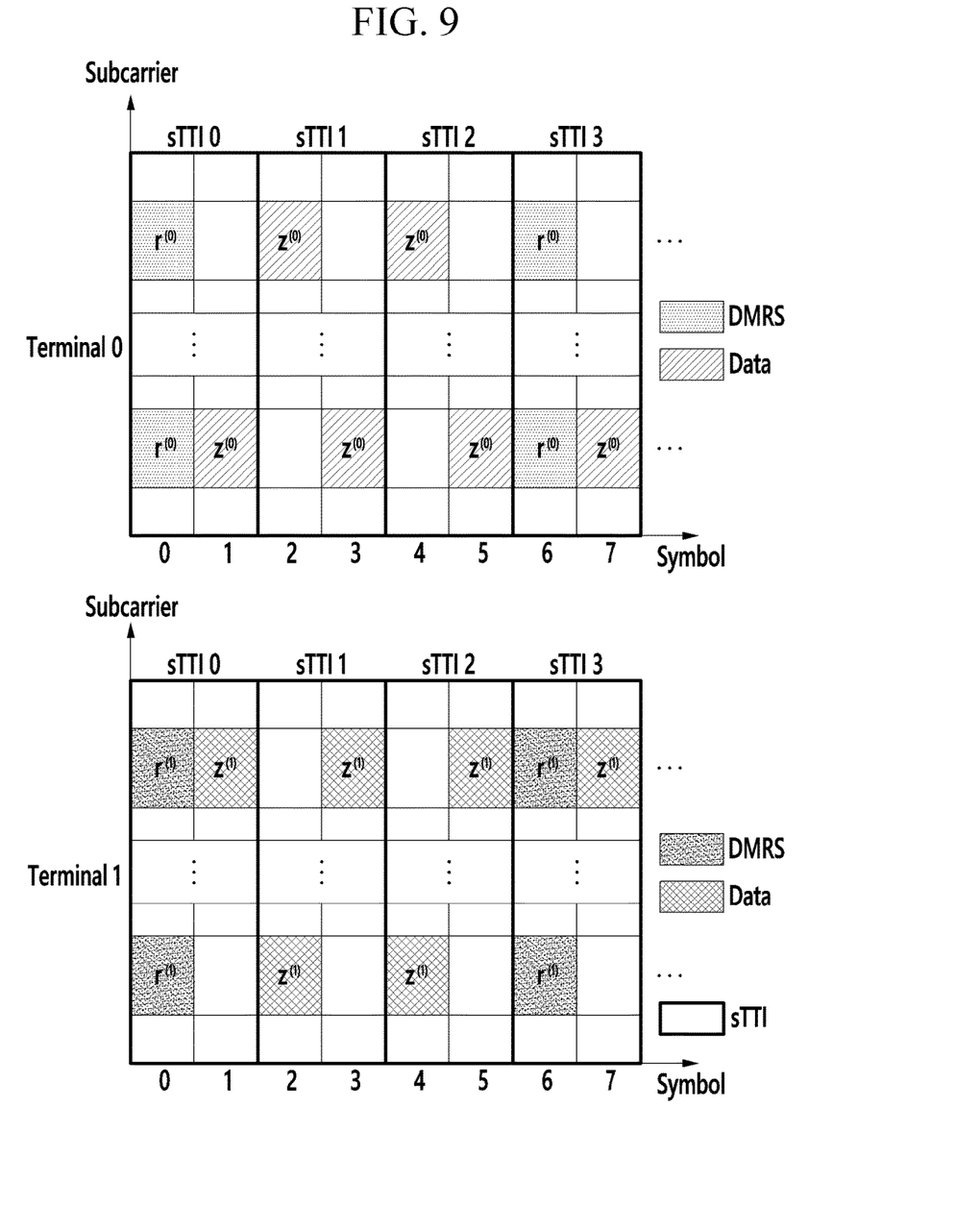
FIG. 9 is a diagram illustrating a method for transmitting, by a terminal, an uplink signal through sTTI having a length of 2 symbols according to yet another exemplary embodiment of the present invention.

FIG. 7 is a diagram illustrating a method for transmitting, by a terminal, an uplink signal through sTTI having a length of 2 symbols according to an exemplary embodiment of the present invention, FIG. 8 is a diagram illustrating a method for transmitting, by a terminal, an uplink signal through sTTI having a length of 2 symbols according to another exemplary embodiment of the present invention, and FIG. 9 is a diagram illustrating a method for transmitting, by a terminal, an uplink signal through sTTI having a length of 2 symbols according to yet another exemplary embodiment of the present invention.

Referring to FIGS. 7 and 8, the DMRS is located only at even-numbered sTTIs and odd-numbered sTTIs and only data are transmitted at sTTI that does not include the DMRS Therefore, a DMRS overhead may be more reduced, compared to the case in which the DMRS is transmitted at all sTTIs. Further, at the sTTI where the DMRS is not transmitted, frequency diversity may be obtained through two symbols. Referring to FIG. 7, at two adjacent even-numbered sTTIs, the DMRS is transmitted through the same frequency resource and referring to FIG. 8, at two adjacent even-numbered sTTIs, the DMRS is transmitted through different frequency resources. At this time, the location of the DMRS may be different per sTTI. At this time, the location of the DMRS may be selected depending on the moving speed of the terminal, radio channel characteristics like delay spread, and the number of sTTIs required to transmit one code block. The number of sTTIs required to transmit one code block may be determined depending on a delay value permitted in a radio transmission section.

Referring to FIG. 9, the DMRS is transmitted at three sTTI intervals. That is, in some cases, the interval of the sTTI including the DMRS may also be adjusted.

Figure 10:
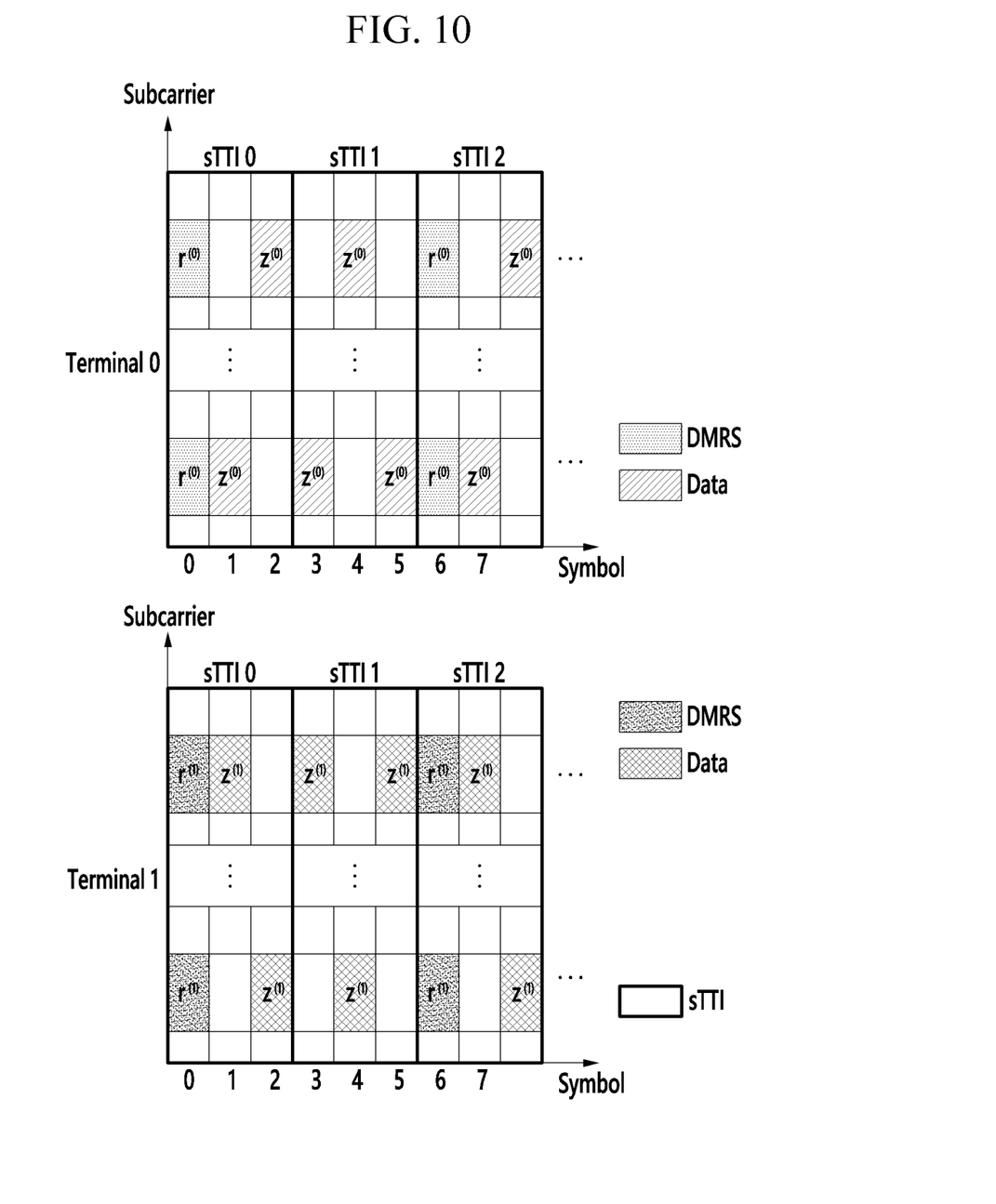
FIG. 10 is a diagram illustrating a method for transmitting, by a terminal, an uplink signal through sTTI having a length of 3 symbols according to an exemplary embodiment of the present invention.

FIG. 10 is a diagram illustrating a method for transmitting, by a terminal, an uplink signal through sTTI having a length of 3 symbols according to an exemplary embodiment of the present invention.

Referring to FIG. 10, the DMRS is located only at even-numbered sTTIs and odd-numbered sTTIs and only data are transmitted at sTTI that does not include the DMRS. Therefore, the DMRS overhead may be more reduced, compared to the case in which the DMRS is transmitted at all sTTIs.

The resource allocation method described with reference to FIGS. 7 to 10 may be applied to FIGS. 2 to 6 as it is. That is, with reference to FIGS. 2 to 6, the DMRS may be transmitted only at a specific sTTI and one of the subsequent sTTI of the specific sTTI.

According to an embodiment of the present invention, it is possible to obtain the frequency diversity gain without increasing the PAPR of the data channel, by transmitting the uplink signal through the sTTI including the smaller number of symbols.

Figure 11:
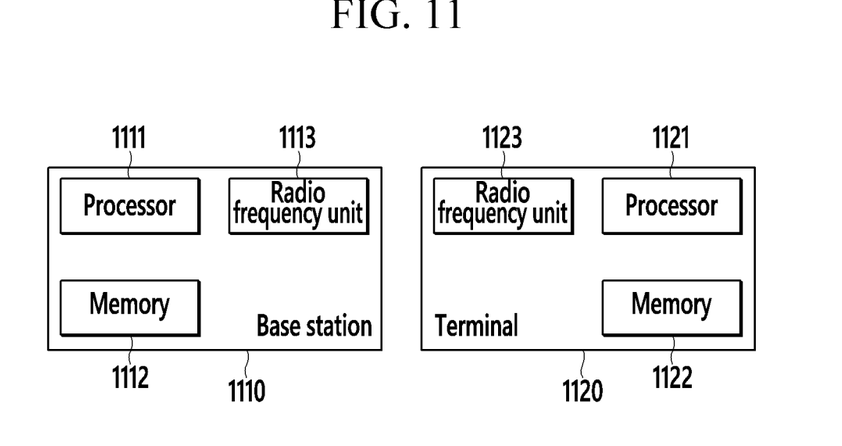
FIG. 11 is a block diagram illustrating a wireless communication system according to an exemplary embodiment of the present invention.

FIG. 11 is a block diagram illustrating a wireless communication system according to an exemplary embodiment of the present invention.

Referring to FIG. 11, a wireless communication system according to an exemplary embodiment of the present invention includes a base station 1110 and a terminal 1120.

The base station 1110 includes a processor 1111, a memory 1112, and a radio frequency unit (RF unit) 1113. The memory 1112 may be connected to the processor 1111 to store various pieces of information for driving the processor 1111 or at least one program executed by the processor 1111. The radio frequency unit 1113 may be connected to the processor 1111 to transmit/receive a wireless signal. The processor 1111 may implement functions, processes, or methods proposed by the exemplary embodiment of the present disclosure. In this case, in the wireless communication system according to the exemplary embodiment of the present invention, a wireless interface protocol layer may be implemented by the processor 1111. An operation of the base station 1110 according to the exemplary embodiment of the present invention may be implemented by the processor 1111.

The terminal 1120 includes a processor 1121, a memory 1122, and a radio frequency unit 1123. The memory 1122 may be connected to the processor 1121 to store various pieces of information for driving the processor 1121 or at least one program executed by the processor 1121. The radio frequency unit 1123 may be connected to the processor 1121 to transmit/receive a wireless signal. The processor 1121 may implement functions, processes, or methods proposed by the exemplary embodiment of the present disclosure. In this case, in the wireless communication system according to the exemplary embodiment of the present invention, a wireless interface protocol layer may be implemented by the processor 1121. An operation of the terminal 1120 according to the exemplary embodiment of the present invention may be implemented by the processor 1121.

According to the exemplary embodiment of the present invention, the memory may be positioned inside or outside the processor and the memory may be connected to the processor through already known various means. The memory is various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting an uplink signal by a terminal, comprising:
   transmitting demodulation reference signals (DMRSs) for demodulating uplink data through a plurality of clusters in a frequency domain in a first symbol among a plurality of symbols in a time domain, wherein the plurality of symbols and the plurality of clusters are included in a short transmit time interval (sTTI) including 3, 4, 5, 6, or 7 symbols and each of the plurality of clusters corresponds to different subcarriers;
   transmitting first uplink data through a first cluster among the plurality of clusters in the frequency domain in a second symbol among the plurality of symbols in the time domain after transmission of the DMRSs; and
   transmitting second uplink data through a second cluster among the plurality of clusters in the frequency domain in a third symbol among the plurality of symbols in the time domain after transmission of the first uplink data,
   wherein the DMRSs of the terminal are multiplexed with at least one reference signal of other terminals in the first symbol, a DMRS transmitted in the first cluster is transmitted to be used for demodulation of the first uplink data and a DMRS transmitted in the second cluster is transmitted to be used for demodulation of the second uplink data, and the second cluster is located apart from the first cluster in the frequency domain.

2. The method of claim 1, wherein:
   the transmitting of the DMRSs includes
   multiplying the DMRSs by a cyclic shift coefficient consisting of a component for differentiating a terminal and a subcarrier number through which the DMRS is transmitted.

3. The method of claim 1, wherein:
   the transmitting of the DMRSs includes
   multiplying the DMRSs by an orthogonal cover code (OCC).

4. The method of claim 1, further comprising:
   transmitting third uplink data through the first cluster in the frequency domain in the first symbol in the time domain in a first sTTI adjacent to the sTTI and transmitting fourth uplink data through the second cluster in the frequency domain in a second symbol in the time domain in the first sTTI when each of the sTTI and the first sTTI includes 3, 5, or 7 symbols.

5. The method of claim 1, wherein:
   the transmitting of the DMRS includes
   transmitting the DMRS through even-numbered subcarriers or odd-numbered subcarriers in the first symbol of the sTTI.

6. The method of claim 1, further comprising:
   transmitting third uplink data in-through all symbols included in a first sTTI adjacent to the sTTI when each of the sTTI and the first sTTI includes 3 symbols, wherein the third uplink data transmitted in the first sTTI is allocated to different clusters for each symbol of the first sTTI.

7. A terminal, comprising:
   a processor, a memory, and a radio frequency (RF) unit, wherein the processor executes a program stored in the memory to perform:
   transmitting, by using the RF unit, demodulation reference signals (DMRSs) for demodulating uplink data through a plurality of clusters in a frequency domain in a first symbol among a plurality of symbols in a time domain, wherein the plurality of symbols and the plurality of clusters are included in a short transmit time interval (sTTI) including 2 symbols and each of the plurality of clusters corresponds to different subcarriers;
   transmitting, by using the RF unit, first uplink data through a first cluster among the plurality of clusters in the frequency domain in a second symbol among the plurality of symbols in the time domain in the sTTI after transmission of the DMRSs;
   transmitting, by using the RF unit, second uplink data through a second cluster in the frequency domain in the first symbol in the time domain in an adjacent sTTI which neighbors the sTTI after transmission of the first uplink data; and
   transmitting, by using the RF unit, third uplink data through the first cluster in the frequency domain in a second symbol in the time domain in the adjacent sTTI after transmission of the second uplink data,
   wherein the DMRSs of the terminal are multiplexed with at least one reference signal of other terminals in the first symbol, a DMRS transmitted in the first cluster is transmitted to be used for demodulation of the first uplink data and the third uplink data and a DMRS transmitted in the second cluster is transmitted to be used for demodulation of the second uplink data, and the second cluster is located apart from the first cluster in the frequency domain.

8. The terminal of claim 7, wherein:
   the processor performs
   multiplying the DMRSs by a cyclic shift coefficient consisting of a component for differentiating a terminal and a subcarrier number through which the DMRS is transmitted, when the transmitting of the DMRSs is performed.

9. The terminal of claim 7, wherein:
   the processor performs
   multiplying the DMRSs by an orthogonal cover code (OCC), when the transmitting of the DMRSs is performed.

10. A method for receiving an uplink signal by a base station, comprising:
    receiving demodulation reference signals (DMRSs) for demodulating uplink data from a first terminal and a second terminal through a plurality of clusters in a frequency domain in a first symbol among a plurality of symbols in a time domain, wherein the plurality of symbols and the plurality of clusters are included in a short transmit time interval (sTTI) including 3, 4, 5, 6, or 7 symbols and each of the plurality of clusters corresponds to different subcarriers;
    receiving first uplink data through a first cluster among the plurality of clusters in the frequency domain in a second symbol among the plurality of symbols in the time domain from the first terminal after reception of the DMRSs;
    receiving second uplink data through the first cluster in the frequency domain in a third symbol among the plurality of symbols in the time domain from the second terminal after reception of the first uplink data;

demodulating the first uplink data based on a DMRS received from the first terminal in the first symbol; and
demodulating the second uplink data based on a DMRS received from the second terminal in the first symbol,
wherein the DMRS from the first terminal and the DMRS from the second terminal are multiplexed in the first symbol, and the second cluster is located apart from the first cluster in the frequency domain.

11. The method of claim 10, wherein:
the receiving of the DMRSs includes
receiving the DMRS from the first terminal through even-numbered subcarriers in the first symbol of the sTTI; and
receiving the DMRS from the second terminal through odd-numbered subcarriers in the first symbol of the sTTI.

* * * * *